(12) United States Patent
Pearson et al.

(10) Patent No.: US 9,304,023 B2
(45) Date of Patent: Apr. 5, 2016

(54) FLOW METER WITH ACOUSTIC ARRAY

(71) Applicant: Rubicon Research Pty Ltd, Hawthorn, Victoria (AU)

(72) Inventors: Damien Vernon Pearson, Hawthorn (AU); Kevin Hooper, Balwyn North (AU)

(73) Assignee: Rubicon Research Pty Ltd, Hawthorn East, Victoria (AU)

( * ) Notice: Subject to any disclaimer, the term of this patent is extended or adjusted under 35 U.S.C. 154(b) by 0 days.

(21) Appl. No.: 14/422,656

(22) PCT Filed: Aug. 26, 2013

(86) PCT No.: PCT/AU2013/000946
§ 371 (c)(1),
(2) Date: Feb. 19, 2015

(87) PCT Pub. No.: WO2014/032083
PCT Pub. Date: Mar. 6, 2014

(65) Prior Publication Data
US 2015/0241256 A1    Aug. 27, 2015

(30) Foreign Application Priority Data

Aug. 28, 2012 (AU) ................................ 2012903697

(51) Int. Cl.
*G01F 1/66* (2006.01)
(52) U.S. Cl.
CPC ........................................ *G01F 1/66* (2013.01)
(58) Field of Classification Search
USPC ....................................................... 73/861.18
See application file for complete search history.

(56) References Cited

FOREIGN PATENT DOCUMENTS

DE           4443483 A1    6/1996

OTHER PUBLICATIONS

International Application No. PCT/AU2013/000946, International Search Report and Written Opinion mailed Nov. 12, 2013.

*Primary Examiner* — Jewel V Thompson
(74) *Attorney, Agent, or Firm* — Sheppard, Mullin, Richter & Hampton LLP

(57) ABSTRACT

The present invention provides a flow meter for a pipe or open channel. The flow meter has a longitudinal member adapted to be inserted into the pipe or open channel but free of any internal wall of the pipe or open channel. The longitudinal member has a plurality of pairs of acoustic transducers located there around, with each pair of acoustic transducers having a transmitting transducer and a receiving transducer. The transmitting transducer sends an acoustic signal to an internal wall of the pipe or open channel and the receiving transducer receives the reflected acoustic signal.

22 Claims, 27 Drawing Sheets

FLOW METER WITH ACOUSTIC ARRAY

CROSS-REFERENCE TO RELATED APPLICATIONS

This application is a national stage application pursuant to 35 U.S.C. §371 of International Application No. PCT/AU2013/000946, filed Aug. 26, 2013, which claims priority to Australian Patent Application No. 2012903697, filed Aug. 28, 2012, the disclosures of which are hereby incorporated by reference herein.

BACKGROUND OF THE INVENTION

The present invention relates to a flow meter for fluids and relates particularly, although not exclusively, to a flow meter for irrigation pipe lines.

PRIOR ART

A popular method of measuring flow rates within pipes is the use of propeller meters. These devices are at least fifty years old and rely on a propeller projecting inside the pipe with its axis located at the centre of, and parallel to, the flow. The spindle of the propeller can be connected by gearing to a measuring meter external to the pipe. The meter can be mechanically based using gearing or can generate magnetic or electric fields which can be associated with an appropriate measuring interface. Propeller meters have been widely used in a standard pipe riser design. These propeller meters are prone to mechanical wear (especially of the spindle bearings), and clogging of the propeller. In culvert pipes the propeller can be easily obstructed by debris and weeds. In addition, it is very difficult to detect a malfunction or unauthorised interference to the meter whilst operating. For accuracy of measurement, propeller meters have limitations on their fitting location within the pipe as they must be located clear of pipe bends.

OBJECTS OF THE INVENTION

An object of the invention is to provide a flow meter that can readily be a drop in replacement for a propeller meter.

A further object of the invention is to provide a flow meter which has no moving parts.

SUMMARY OF THE INVENTION

The present invention provides a flow meter for a pipe or open channel, said flow meter including a longitudinal member adapted to, in use, be inserted into said pipe or open channel but free of any internal wall of said pipe or open channel, said longitudinal member having a plurality of pairs of acoustic transducers located therearound with each pair of acoustic transducers having a transmitting transducer and a receiving transducer, whereby said transmitting transducer sends an acoustic signal to said internal wall of said pipe or open channel and said receiving transducer receives the reflected acoustic signal.

Preferably said longitudinal member has a cylindrical or polygonal shape.

In another preferred embodiment said longitudinal member is secured to an end cap member of a pipe riser fitted to said pipe.

In a practical embodiment said longitudinal member is mounted to a bracket installed through an access port on the side of said pipe. Preferably small angles separate respective pairs of acoustic transducers to significantly reduce the likelihood of a flow direction change within the measuring area for each pair of acoustic transducers.

The invention may have said longitudinal member mounted on a shaft of an axial screw pump within said pipe. Preferably a plurality of flow straightening vanes is attached to said longitudinal member upstream of said acoustic transducers. The invention may have said acoustic transducers being switchable between receiving and transmitting acoustic signals. A further preferment provides each of said receiving transducers being axially offset from each of said transmitting transducers.

The invention may have a single pair of transmitting and receiving transducers, or it may have a multitude of pairs of transmitting and receiving transducers arranged about said longitudinal member. Preferably said longitudinal member is centrally or eccentrically aligned with said pipe or open channel.

A further aspect of the invention may include each of said transducers being adjustable for correct alignment. Preferably said longitudinal member is rotatable, in use.

Preferably said acoustic transducers are set at the desired angle through appropriate recesses in a body member.

In a further example of the invention an additional acoustic array is included on said longitudinal member to allow for the concentricity of the longitudinal member to be verified.

BRIEF DESCRIPTION OF THE DRAWINGS

The structure and functional features of preferred embodiments of the present invention will become more apparent from the following detailed description when taken in conjunction with the accompanying drawings, in which:—

DESCRIPTION OF THE PREFERRED EMBODIMENTS

Figure 1:
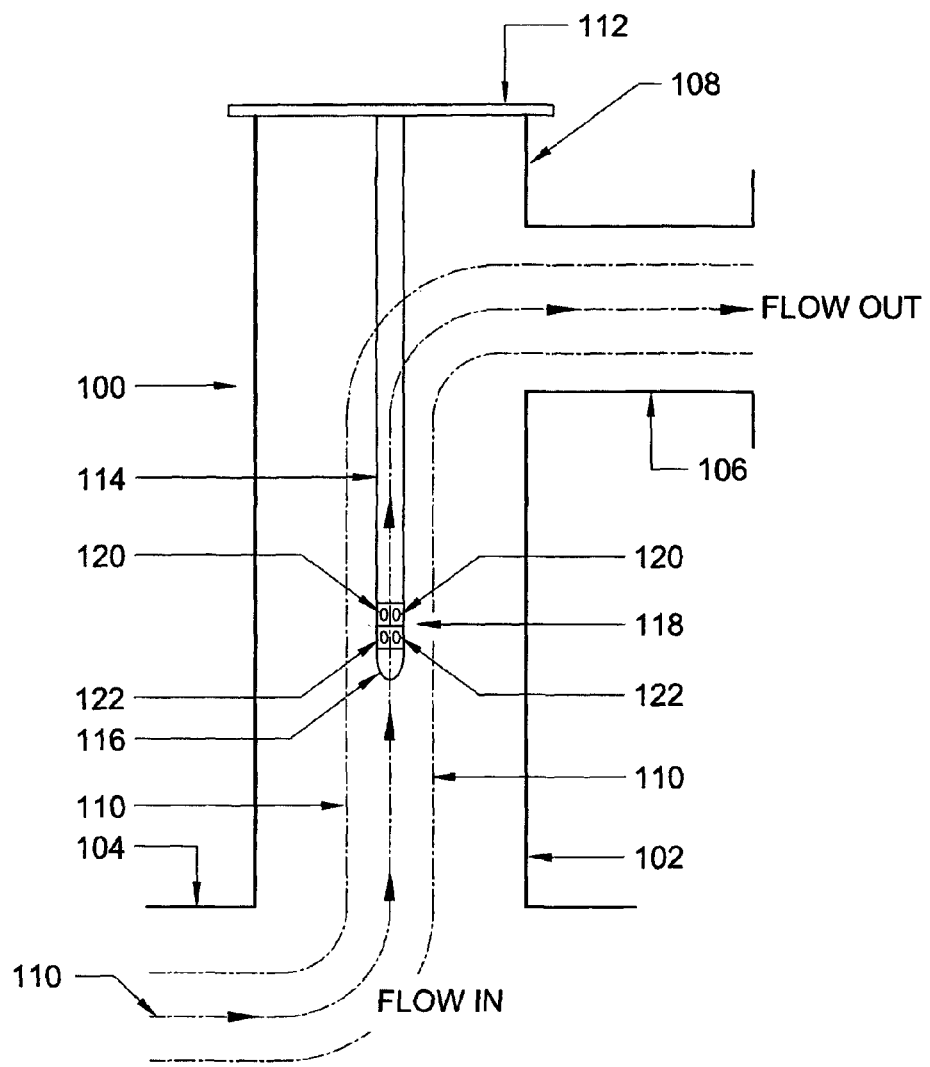
FIG. 1 is a cross-sectional view of a first embodiment of the invention showing a flow meter located within a pipe having a riser.

In order to avoid duplication of description, identical reference numerals will be shown, where applicable, throughout the illustrated embodiments to indicate similar integers.

Figure 2:
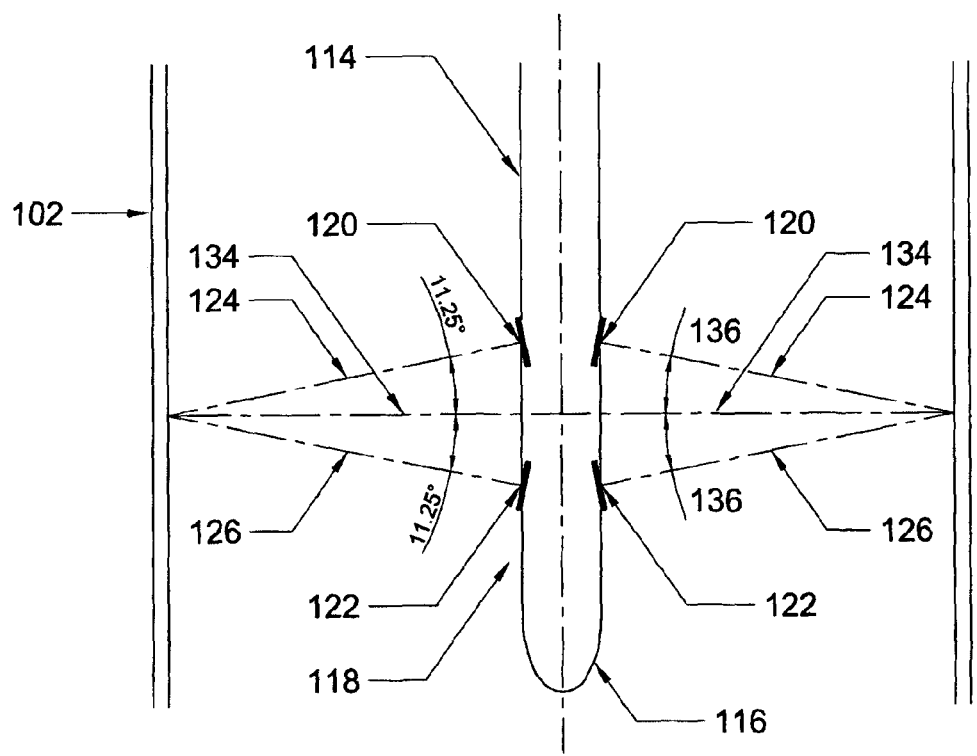
FIG. 2 is an enlarged view of a part of the longitudinal member of the flow meter shown in FIG. 1.

In FIGS. 1 and 2 there is shown a flow meter 100 incorporated into a riser pipe 102. Riser pipe 102 is coupled to an inlet pipe 104 at one end and an outlet pipe 106 at the other end. The riser pipe 102 is provided to allow measurement of flow velocity of moving liquid as indicated by arrows 110. Such a setup is commonly used as previously discussed in relation to the prior art with a propeller meter (not shown) inserted through an access flange stub 108 and set into position with a cap member 112 to which the propeller meter would be fitted. In this embodiment the propeller meter could be interchanged with the flow meter of the present invention as hereinafter discussed.

A smooth cylindrical longitudinal member 114 is concentrically located within pipe 102 and attached to cap member 112. Member 114 has an aerodynamic nose 116 to reduce turbulence and interference with the flow of liquid through pipe 102. The aerodynamic nose may be located several diameters upstream of the acoustic transducers to allow the flow streamlines to align parallel to the pipe walls before crossing the acoustic array. A streamlined aerodynamic nose 116 on the upstream end of member 114 will reduce the head loss that the member will contribute in obstructing flow and to reduce the likelihood of debris fouling upon the member. The member 114 may have an aerodynamic profile at both ends such that the member does not unduly create head loss in bidirectional flows. An acoustic array 118 is assembled around the outer periphery of member 114. Acoustic array 118 has a plurality of acoustic transducers 120, 122 arranged in vertically offset pairs to provide transmitting and receiving transducers. In practice, each transducer 120, 122 serves a dual purpose of transmitter and receiver and is controlled by software which is programmed to alternate each transducer between each of these two purposes. FIG. 2 illustrates that the acoustic transducers 120 are angled to provide an incident path 124 and a reflected path 126 by reflection from the internal wall of pipe 102. Accordingly, the speed of sound within the fluid is determined by summing the two measured flight times of the incident path and reflected path and dividing this by the sum of the known equal path lengths 124 and 126. The difference in the two measured travel times is directly proportional to the velocity of the fluid passing through the measurement plane defined between the outer diameter of the acoustic array 118 and the internal wall of pipe 102.

Figure 3:
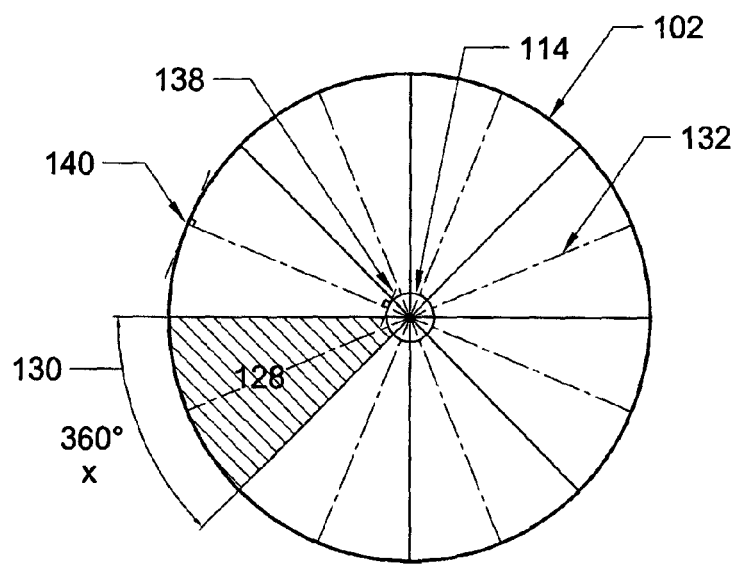
FIG. 3 is a horizontal cross-section of FIG. 2 showing the acoustic paths of the acoustic transducers of the flow meter.
Figure 4:
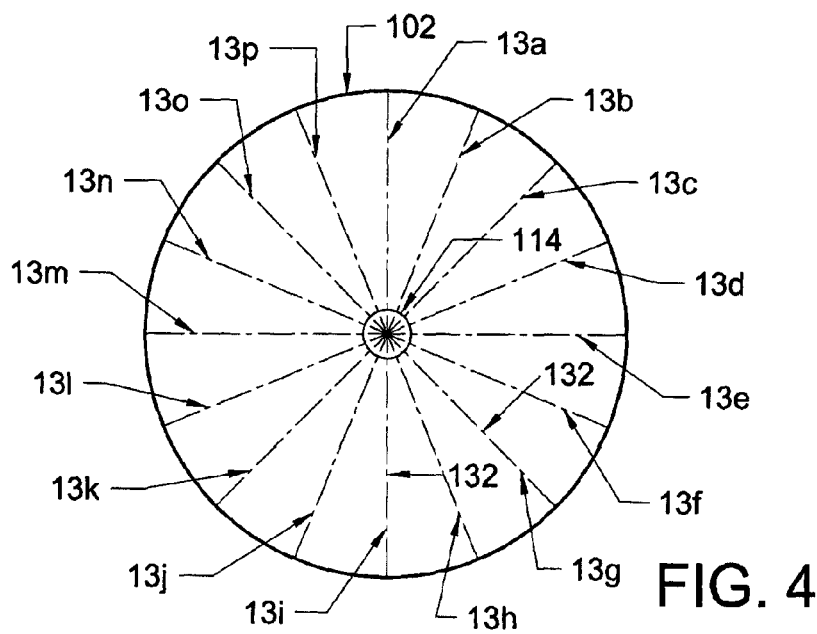
FIG. 4 is a similar view to that of FIG. 3 showing the measurement paths from the acoustic transducers.

A pair of transmitting and receiving acoustic transducers 120, 122 could be used but greater accuracy is obtained by using a greater number of pairs of transmitting and receiving acoustic transducers 120, 122 spaced around member 114. The use of more than two transducers 120, 122 provides measurement redundancy, and allows the flow meter to continue measuring accurately even if one or more transducers fail. This reduces maintenance costs by allowing scheduled rather than reactive maintenance. FIGS. 3 and 4 show the angular range of 360 degrees around the circumference of the pipe 102 can be divided into a plurality of sectors 128 each containing an angular span 130 of 360/x where x is the number of sectors that pipe 102 is hypothetically divided into. A radius 132 is defined passing through the angular mid-point of each sector. Each of the measurement planes 134 of the acoustic array 118 is coincident with each of these radii 132. At the intersection of the cylindrical periphery of member 114 and the measurement plane 134, an orthogonal plane 138 is defined which is parallel with the tangent 140 to the internal wall of pipe 102 at its intersection with the measurement plane 134. This orthogonal plane 138 defines the orientation of an acoustic transducer 120, 122 located at the radial intersection of the cylindrical periphery of member 114 and the measurement plane 134. It can be seen that along each of the measurement planes 134 two acoustic transducers 120, 122 are located either side forming an angle 136 relative to the internal wall of pipe 102. Sound is transmitted radially outward from transmitting transducer 120 and travels to meet the internal wall of pipe 102 at an angle 136. In this embodiment the angle 136 is illustrated as 11.25 degrees, however any angle may be used from 0.1 degrees through to 89.9 degrees as is practical. The transmitted sound reflects off the internal wall of pipe 102 at an angle of reflection equal to the angle of incidence 136 and travels back to the receiving transducer 122. The flight time of this transmitted sound is measured by timing electronics (not shown) as previously described in International Patent Application No. PCT/AU2010/001052 and in the ISO Standard 6416:2004(E) Hydrometry—Measurement of discharge by the ultrasonic (acoustic) method. The process is then repeated except that this time sound is transmitted radially outward from acoustic transducer 122 and is received by transducer 120 by reversing their transmitting and receiving functions.

The technique of using a reflected acoustic signal is documented in Section 7.5 Reflected-path Systems of ISO 6416:2004(E). Note that in Section 7.5.4 of this standard it is stated that "The configuration of a reflector system is not that of the symmetrical crossed paths, and it is possible for the direction of flow to change within the gauging section. The reflector system therefore will not give reliable correction for skew flow". This embodiment uses small beam angles such as the preferred 11.25 degrees to result in a small gauging section—meaning that the influence of skew flow referred to in the above statement is minimized in this invention. An aspect of the invention is the use of small beam angles to significantly reduce the likelihood of a flow direction change within the gauging section.

Figure 5:
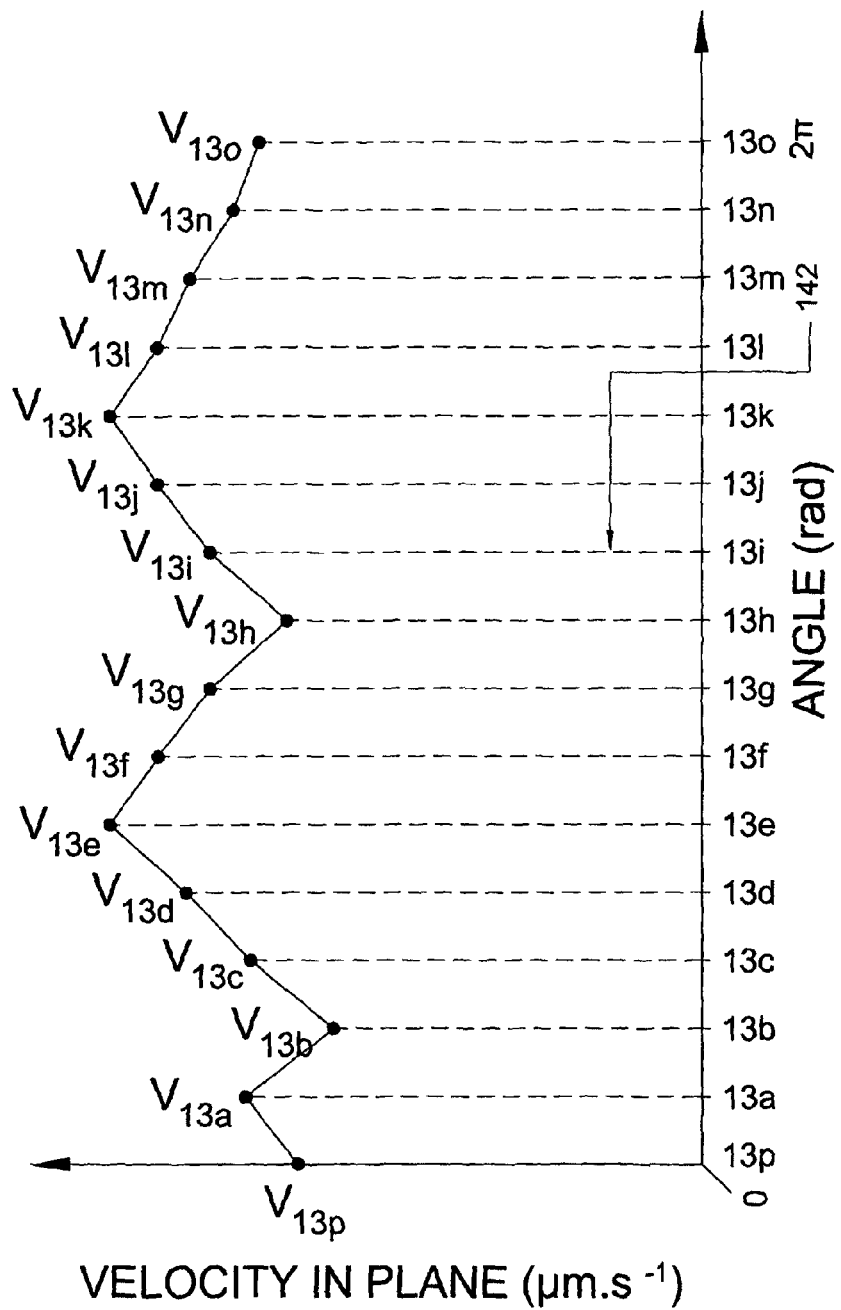
FIG. 5 is a graph of the velocity measured in each plane plotted against the angle of that plane for the measurement paths shown in FIG. 4.
Figure 6:
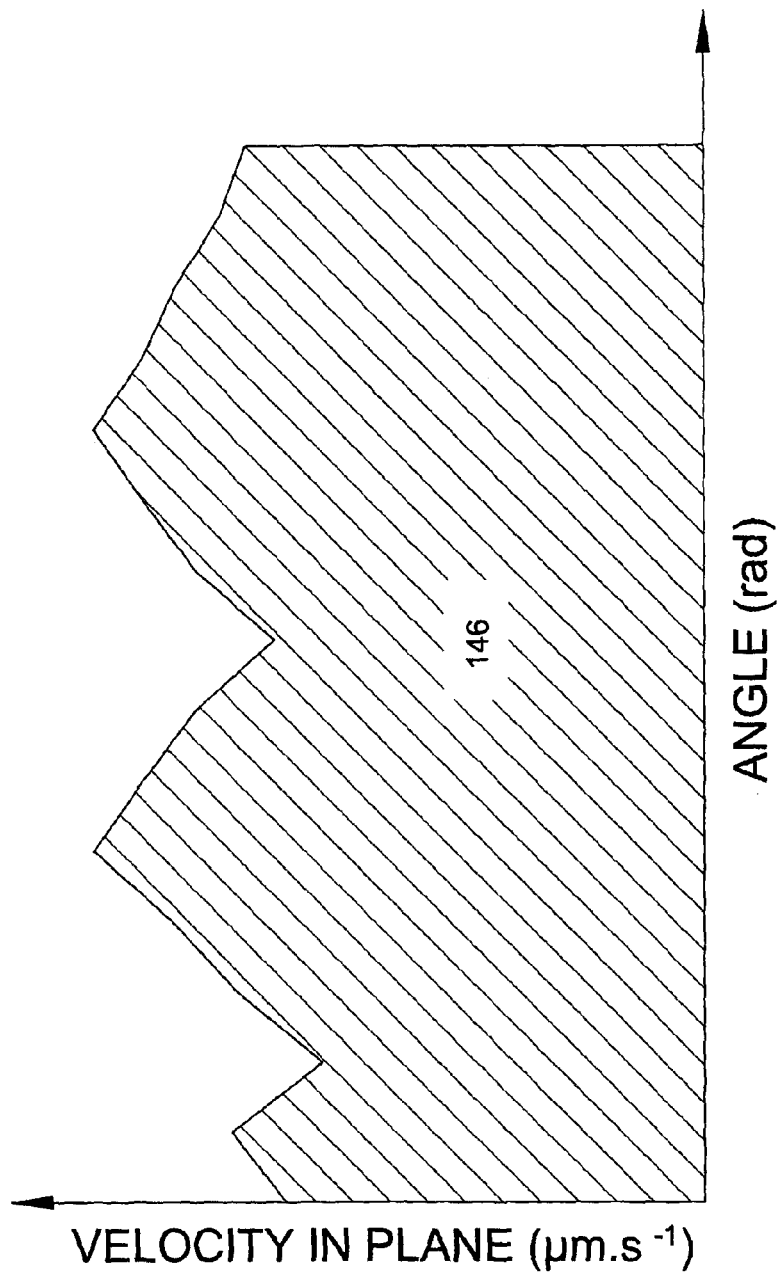
FIG. 6 is the graph of FIG. 5 where the area beneath the line joining the angle-velocity points determines the total velocity passing through the pipe and hence the total volumetric flow rate passing through the pipe.

FIG. 4 shows sixteen (16) measurement planes, each labelled as 13a to 13p respectively. Any number of planes may be used, sixteen planes are illustrated for the sake of description of the function of providing multiple measurement planes. The average velocity is measured in each of these measurement planes. Any number of measurement planes may be adopted as limited by the geometric constraint of fitting the acoustic transducers around the periphery of cylindrical member 114. The smaller the size of the acoustic transducers the greater the number of measurement planes that may be employed. The velocity in the radial planes located between these measured planes can be interpolated from the values measured within each of the measurement planes as shown in FIG. 5. The velocity measured in each plane is plotted against the angle of that plane. The velocities in each plane are shown as points V13a to V13p plotted against the angle of the plane 13a to 13p. If a line 142 is constructed joining each of these velocity-angle measurements then any velocity at angle 144 can computed given knowledge of the equation describing this line. The area beneath the line joining the angle-velocity points 146 can then be computed as shown in FIG. 6 to determine the total velocity passing through the pipe 102 and hence the total volumetric flow rate passing through the pipe 102.

Figure 7:
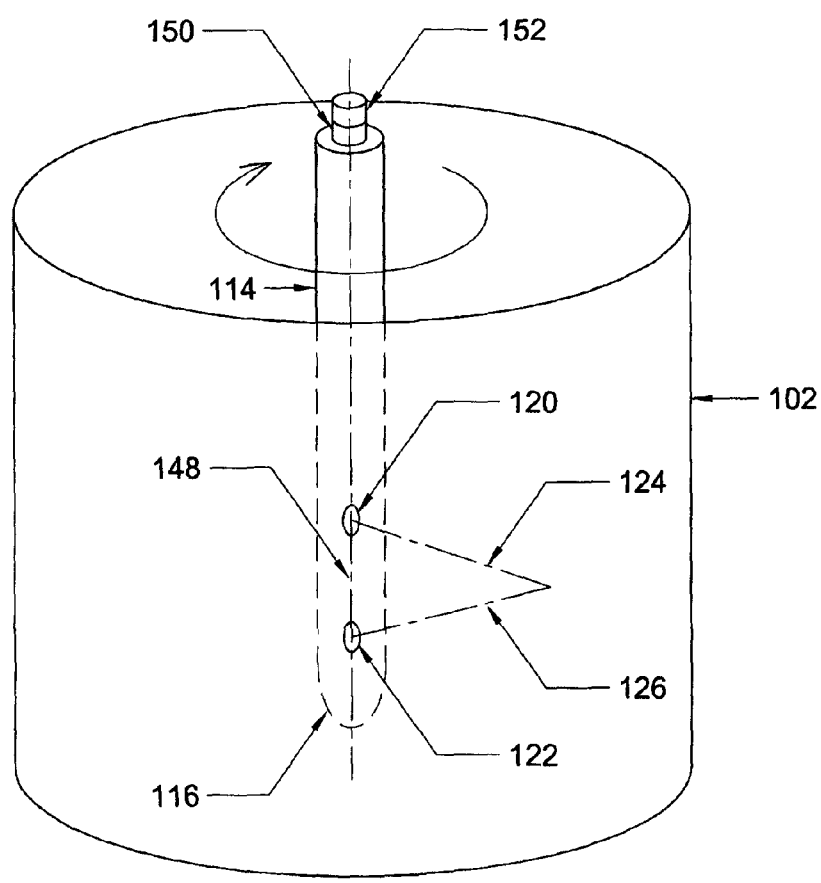
FIG. 7 is a second embodiment of the invention similar to the embodiment shown in FIG. 1 but having the cylindrical longitudinal member rotated rather than stationary.

If an infinite number of measurement planes were defined around the angular span of pipe 102, then the total flow rate passing through the pipe 102 could be computed by simply performing an angular integration of the average velocities passing through each measurement plane. In the embodiment shown in FIG. 7, an infinite number of measurement planes could be inspected by rotating a single acoustic plane 148 through a continuous revolution using an electric motor 150 or any other mechanism for achieving angular rotation and an angular position sensor such as an encoder 152. The transducers measure the average velocity within each radial plane and this measurement is recorded against the angle. The velocity measurement is made at every angle within the 360 degree angular range of the pipe 102, and an angular integration is performed to compute the entire velocity field passing through the pipe 102. However, the use of motor 150 requires a sealed rotating shaft and consumes power and adds cost.

Figure 8:
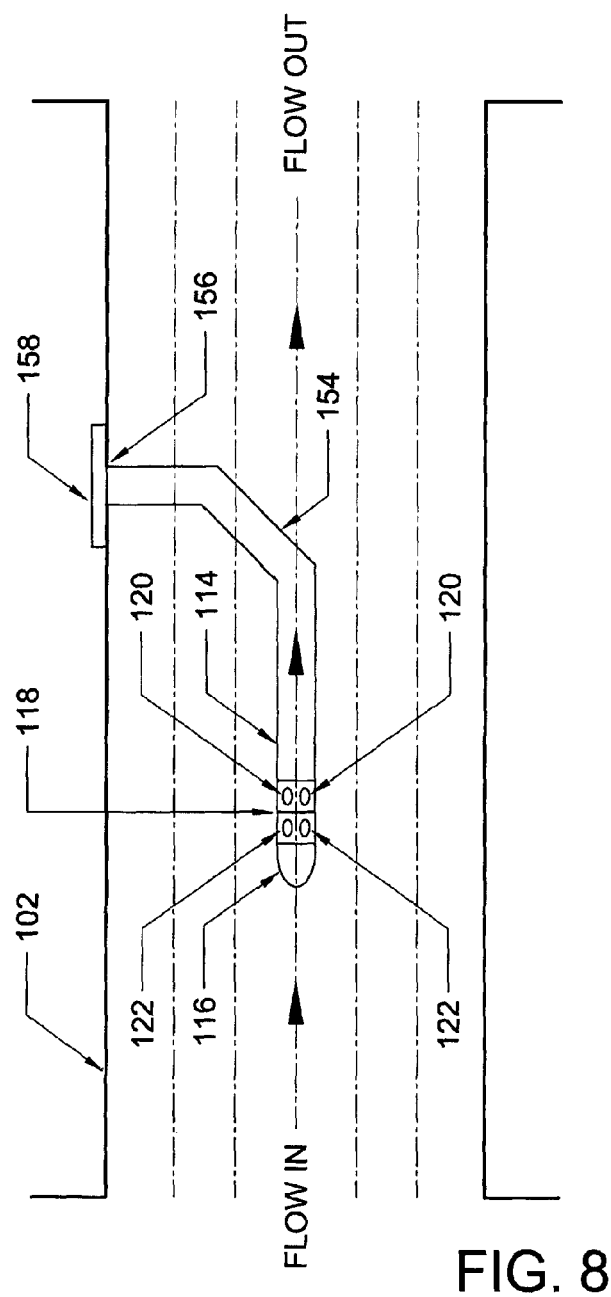
FIG. 8 is a cross-sectional view of a third embodiment of the invention showing a flow meter located centrally within a pipe.

FIG. 8 illustrates the attachment of smooth longitudinal member 114 to a bracket 154 installed through an access port 156 on the side of pipe 102. Propeller meters of the prior art also use this type of access to the inside of pipe 102 and again the invention can be a drop-in replacement for propeller meters. Bracket 154 is of a streamlined profile to minimize drag and head loss and to minimize the potential for debris objects to snag thereon. A cap member 158 is connected to the free end of bracket 154 and can be sealed to the outer periphery of pipe 102. The operation of the flow meter is identical to that of FIG. 1 and is also centrally located within pipe 102.

Figure 9:
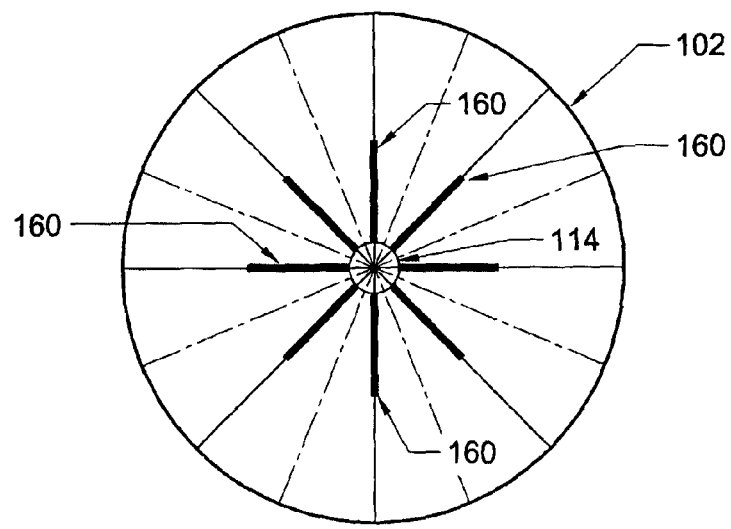
FIG. 9 is an end view of a variation of the embodiments shown in FIGS. 1 and 8, showing flow straightening vanes located on the longitudinal member upstream of the pairs of transmitting and receiving transducers.
Figure 10:
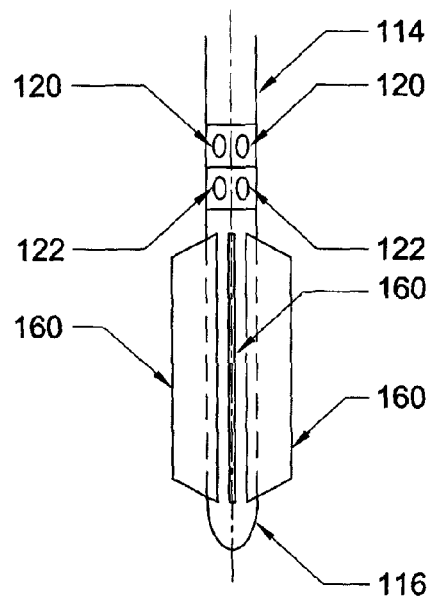
FIG. 10 is a side view of the embodiment shown in FIG. 9.
Figure 11:
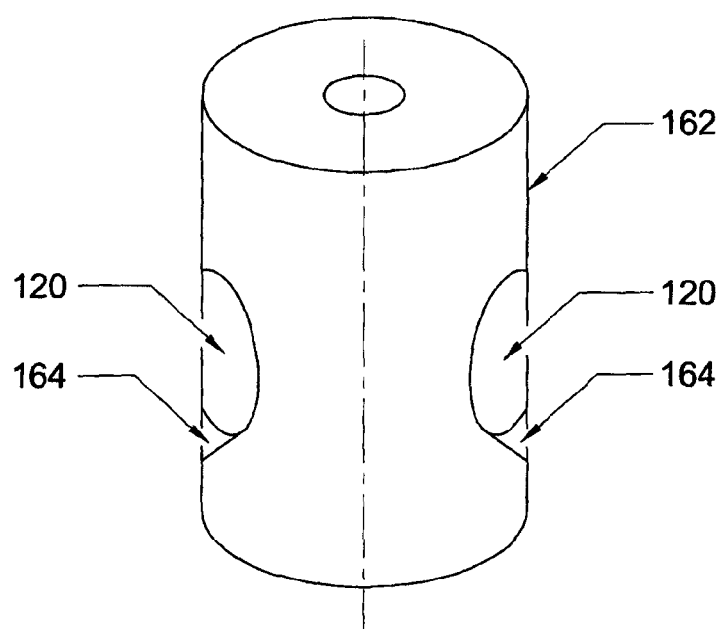
FIG. 11 is a simplified perspective view of a component forming part of the acoustic array.
Figure 12:
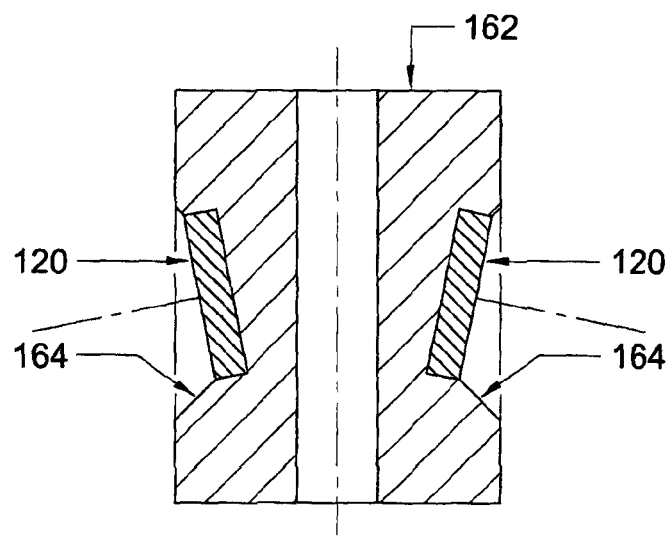
FIG. 12 is a cross-sectional view of FIG. 11.
Figure 13:
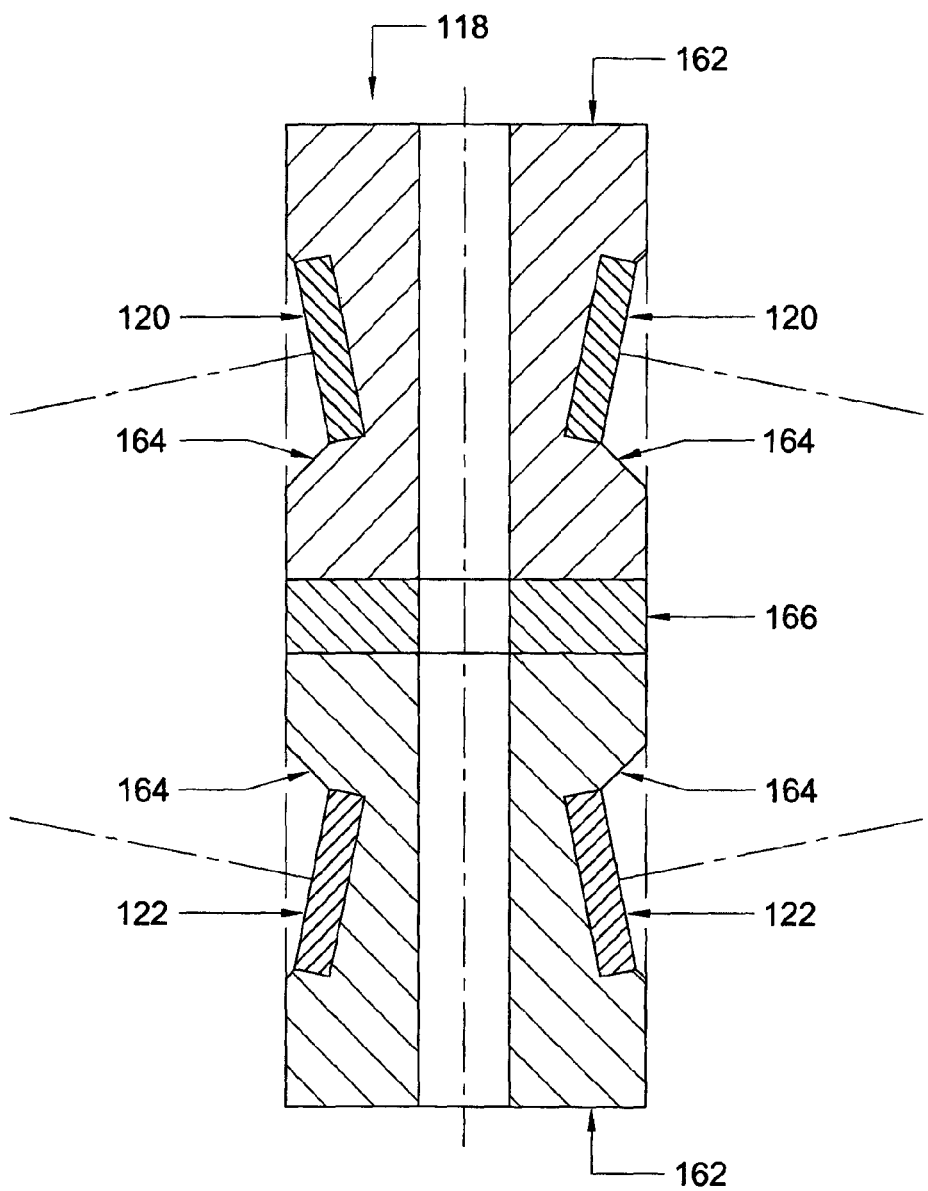
FIG. 13 is a similar view to that of FIG. 12 with a pair of components shown in FIG. 11 which together form the acoustic array.

The embodiments of FIGS. 1 and 8 may include a plurality of flow straightening vanes 160 attached to smooth longitudinal member 114 upstream of acoustic transducers 120, 122. The inclusion of these straightening vanes is illustrated in FIGS. 9 and 10. Vanes 160 will reduce flow swirl and further increase the repeatability and measurement accuracy of the invention The construction of the acoustic array 118 is shown in FIGS. 11 to 13. FIG. 11 shows a donut shaped body member 162 to receive the acoustic transducers 120, 122. Acoustic transducers 120, 122 are set at the desired angle through appropriate recesses 164 in body member 162. FIG. 13 shows the construction of the acoustic array 118 by having a sandwich formed by a pair of donut shaped body members 162 separated by a spacer 166. The length of spacer 166 dictates the relative position of reflection on the internal wall of pipe 102, and so governs the location that the reflection is received back at the acoustic array 118. The spacer 166 is used to ensure that the reflection arrives at the centre of the face of the receiving transducer 122.

Figure 14:
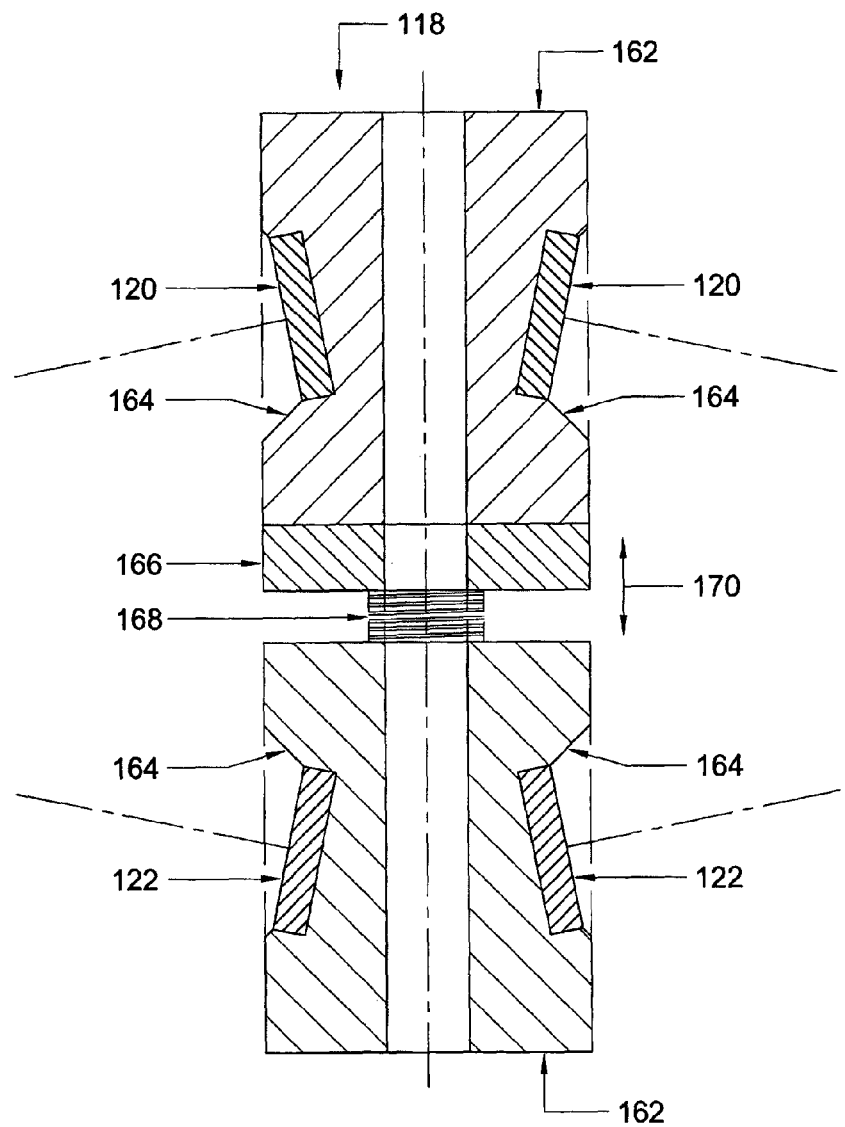
FIG. 14 is a similar view to that of FIG. 13 showing an adjustment member between components which is used to configure the flow measurement device to suit the internal diameter of the pipe into which it is inserted.

FIG. 14 is a variation of FIG. 13 where the space between the body members 162 can be adjusted to suit requirements. In this embodiment spacer 166 may be implemented as part of an adjustable mechanism using the relative motion of a nut incorporated into the upstream body member 162 travelling along a threaded stem 168. The adjustment is indicated by arrows 170. Linear sealing techniques could be employed to maintain a waterproof environment for this vertical translation mechanism, for example, a sealed telescoping shaft as commonly employed in linear actuators. The spacing between the two body members 162 could be adjusted by rotating the threaded stem by hand or this process could be automated using an electric motor and such that the transducer spacing is correctly configured for the pipe diameter that the flow measurement device is inserted into. Other alternatives of linear translation may be used to set the spacing between the two body members 162.

Figure 15:
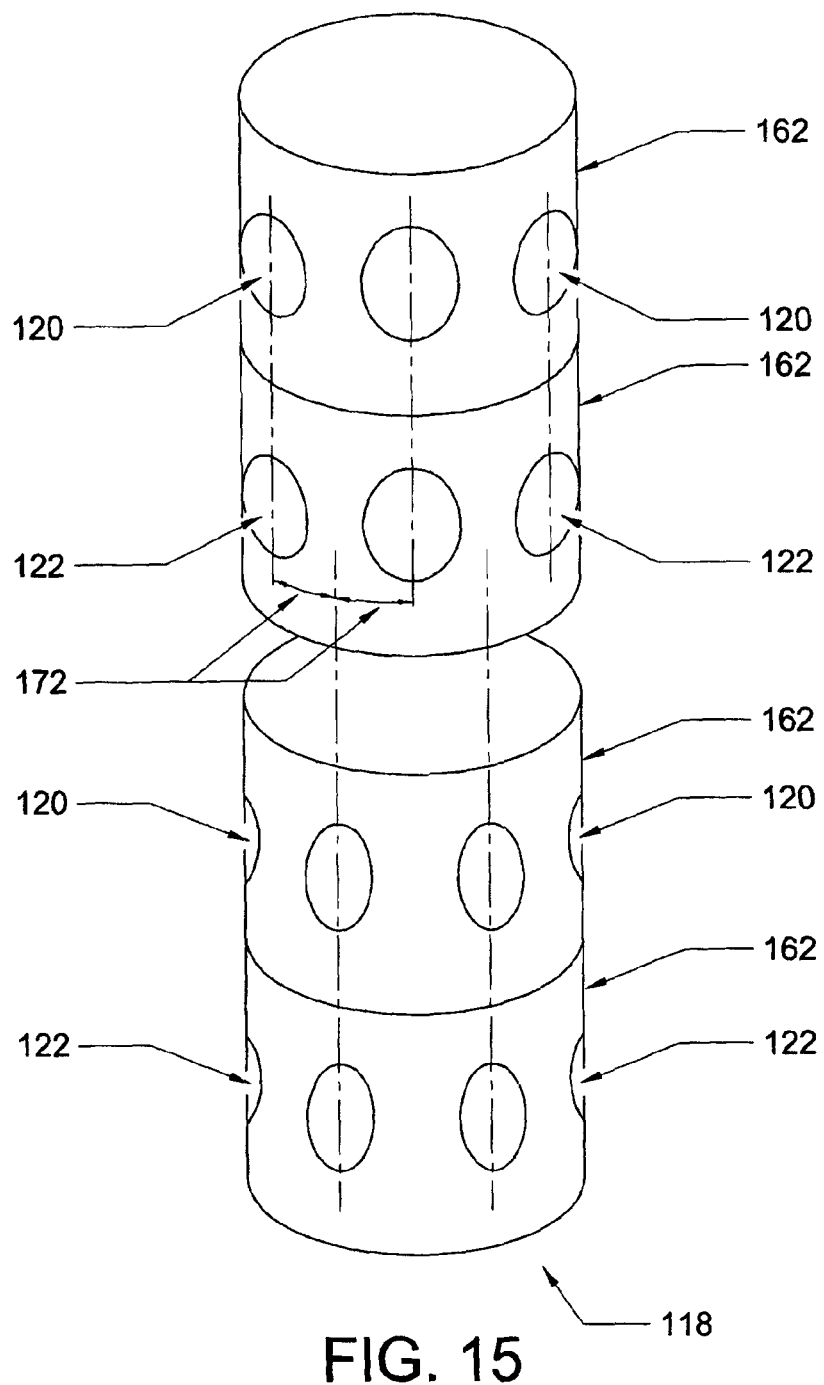
FIG. 15 is a perspective view showing the use of multiple acoustic arrays to increase the angular resolution of the velocity samples measured by the flow measurement device.
Figure 15A:
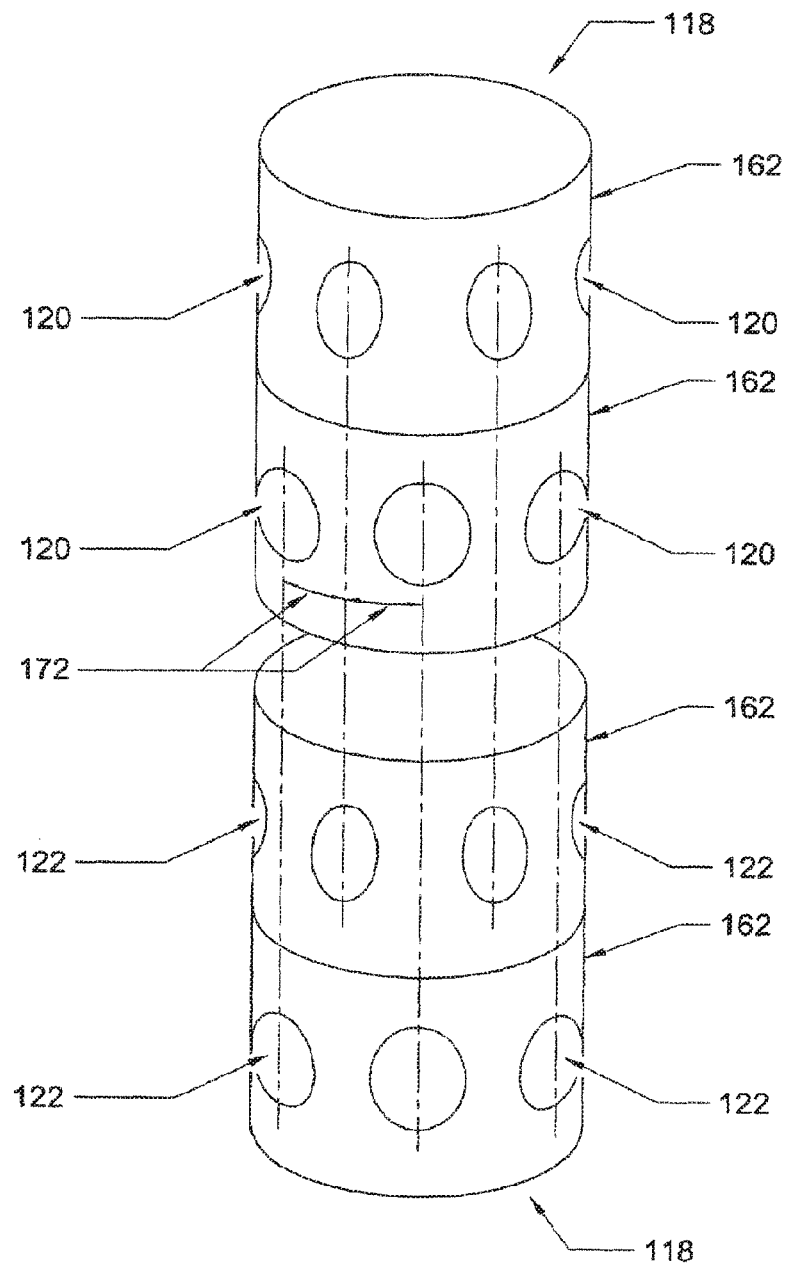
FIG. 15A is a similar view to that of FIG. 15 where the acoustic arrays are interleaved.

A greater number of measurement planes can also be achieved by combining multiple acoustic arrays 118, each having an angular offset required to achieve greater angular resolution 172, as illustrated in FIG. 15. In FIG. 15 the multiple acoustic arrays are configured as two pairs, one pair upstream of the other. An alternative approach would be to inter-leave two pairs of acoustic arrays such that the acoustic arrays are combined in the sequence PairA1-PairB1-PairA2-PairB2. This alternative configuration is illustrated in FIG. 15A.

Figure 16:
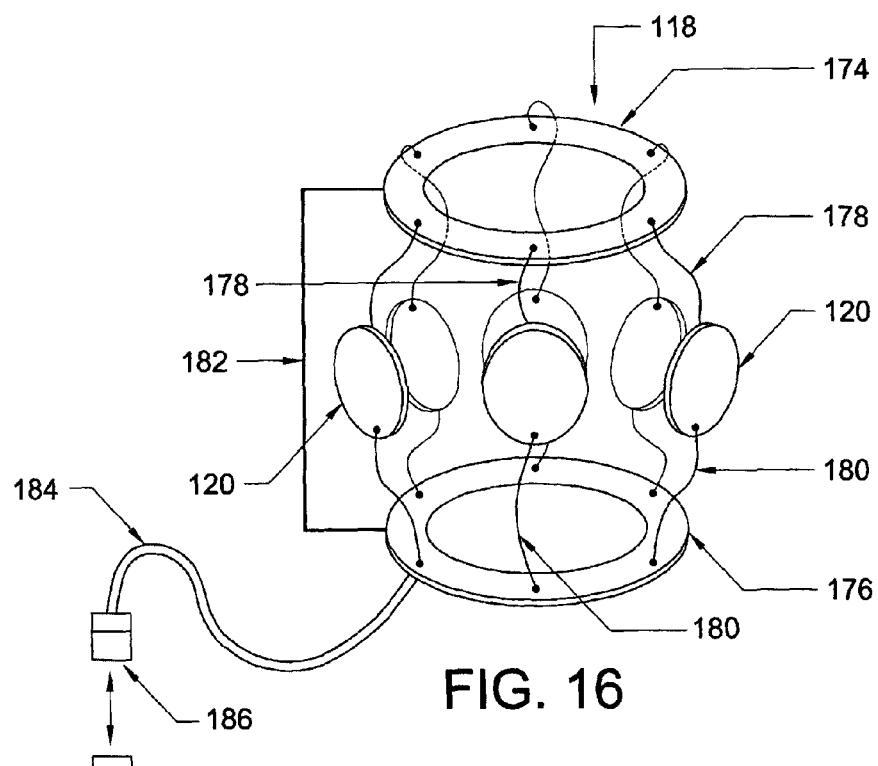
FIG. 16 is a perspective view of the method of formation of the component shown in FIG. 11.
Figure 17:
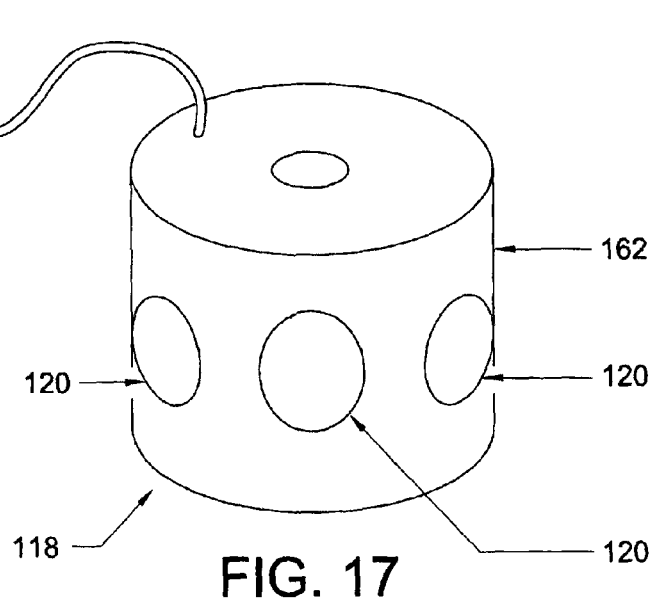
FIG. 17 is a similar view to that of FIG. 11 showing the coupling of the components together.
Figure 18:
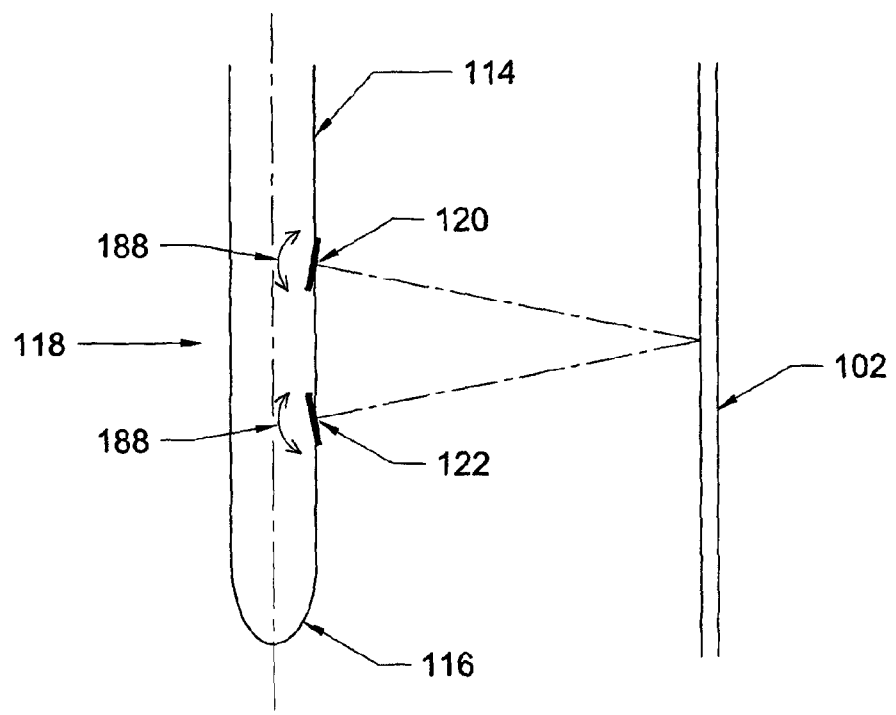
FIG. 18 is a similar view to that of FIG. 2 showing a variation of the adjustability of acoustic transducers.

FIG. 16 shows a method of formation of the acoustic array 118. The acoustic array 118 is constructed from a plurality of acoustic transducers 120, typically piezo transducers which are soldered to electrical connections on printed circuit boards 174 and 176 by conducting cables 178, 180. Each of the printed circuit boards 174, 176 are connected by a board-to-board connector 182 which connects all electrical terminals of the piezo transducers 120 to the one circuit board 176. An external signal loom 184 having an electrical connector 186 is then connected to circuit board 176, and the entire assembly is then encapsulated by potting or other common encapsulation technique to render it water proof This encapsulation forms the donut-shaped body member 162 shown in FIGS. 11 and 17. It would be understood by a person skilled in the art that the piezo transducers 120 would have an acoustically damping material such as cork or rubber bonded to their back face to muffle the acoustic signal on the internally oriented face such that the sound is focused solely on the outer face of the piezo transducers 120. In addition an acoustic window is provided to seal the outer face of the piezo transducer 120.

Rather than setting the acoustic arrays 118 to suit the internal diameter of pipe 102 by adjusting the gap between acoustic arrays 118 as shown in FIG. 14, the length of the smooth cylindrical longitudinal member 114 could remain constant and the acoustic transducers 120, 122 could be adapted to be in a tiltable design to be rotated about their centre as indicated by arrows 188 to configure the beam angle required for the acoustic beam to be received in the centre of the receiver transducer 122.

Figure 19:
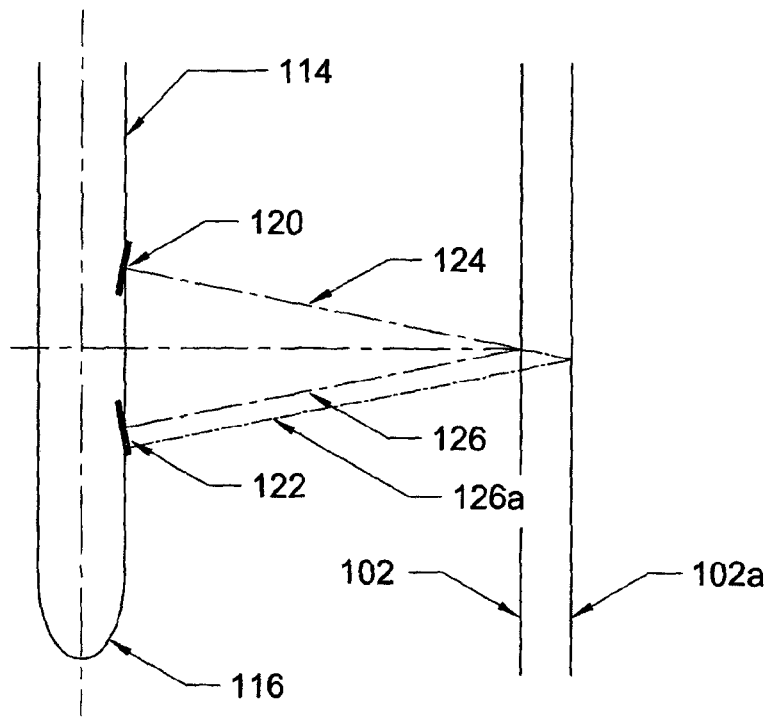
FIG. 19 is a similar view to that of FIG. 18 showing the effects of an off-centre location of acoustic array within the pipe.
Figure 20:
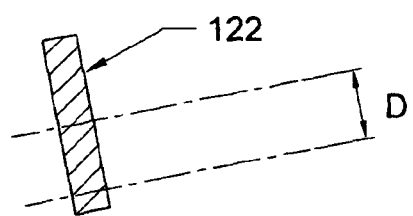
FIG. 20 is an enlarged view of the circled area in FIG. 19.

The use of a relatively small angle of 11.25 degrees of the acoustic transducers as discussed with reference to FIGS. 3 and 4 will provide more tolerance for the acoustic arrays 118 to off centre alignment or an out-of-round pipe 102. Referring to FIG. 19, in the event that the member 114 is not centred, or is firing at an out-of-round pipe 102, the reflected signal is received by the receiving transducer 122 off centre relative to the face of the transducer 122. The translation of the received beam 126a off centre, indicated by measurement D in FIG. 20, is smaller the smaller the angle of the acoustic array 118. The degree of shift off centre of the received transducer is related to the degree of eccentricity or out-of-roundness by the trigonometric tangent relationship. The smaller the beam angles the smaller the influence of eccentricity or out-of-roundness.

The centrality of the installation can be assessed by the combination of travel time measured within each plane, and by the signal strength of the echo received in each plane. If the member 114 is perfectly concentric within a perfectly round pipe 102, then for a homogeneous fluid with a homogeneous temperature, the sum of the travel times in the upstream and downstream direction would be identical in each plane of measurement. If, in one plane of measurement, the acoustic transducers 122 lie further away 102a from the internal perimeter of the pipe 102 than in the opposite plane, then the sum of the travel times in the upstream and downstream directions would be greater in the plane furthest from the pipe wall. A comparison of the travel times in each plane can be used to assist in the centring of the acoustic array 118.

Figure 21:
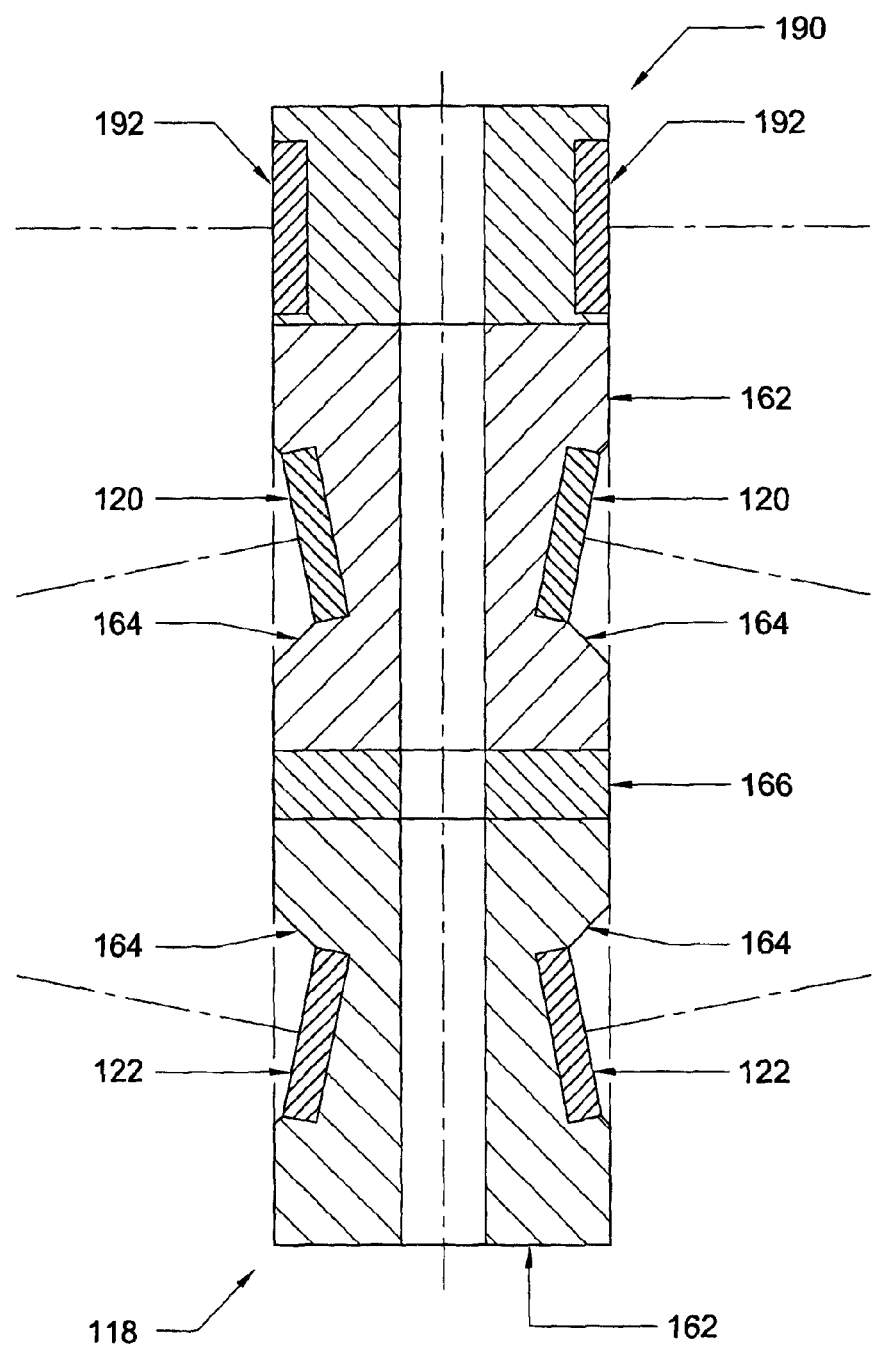
FIG. 21 is a similar view to that of FIG. 13 showing the use of an additional acoustic array to measure the internal diameter of the pipe the array is inserted into and to verify concentricity with this pipe.
Figure 22:
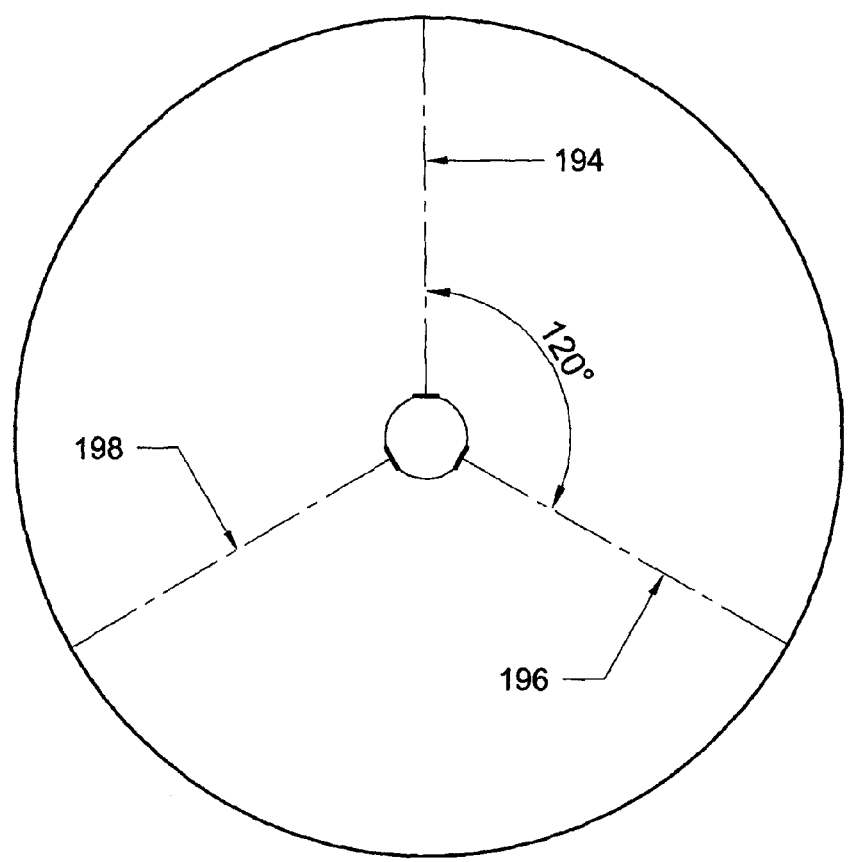
FIG. 22 is a plan view of FIG. 21.

Alternatively, a third acoustic array 190 may be provided in each plane and mounted parallel to the pipe wall, so that the signal emitted from transducers 192 intersect the pipe wall orthogonally and are then reflected back to the same transducer 192 which receives the echo. This arrangement is illustrated in FIGS. 21 and 22. The distance between the transducers 192 and the pipe wall is thereby measured by flight time of this acoustic pulse. If these additional transducers 192 are provided in at least three planes 194, 196, 198 separated by 120 degrees, then the concentricity of the longitudinal member can be verified. This centricity information can be provided on a user interface display (not shown) to assist the technician to achieve a concentric installation. The invention may also include a self-centering system in which a feedback control mechanism is used to adjust the position of the acoustic arrays. Such an orthogonal acoustic array may also be mounted on a travelling arrangement such as a cable mechanism and drawn through the length of a pipe 102 or of a well such as an oil or gas exploration well to provide a high resolution image of the pipe walls without the use of a rotating assembly as is currently known to be employed.

The amplitude of the received signal can also be used as an indication of internal fouling of the pipe walls, and a software algorithm could be used to determine the depth of fouling on the pipe walls.

Figure 23:
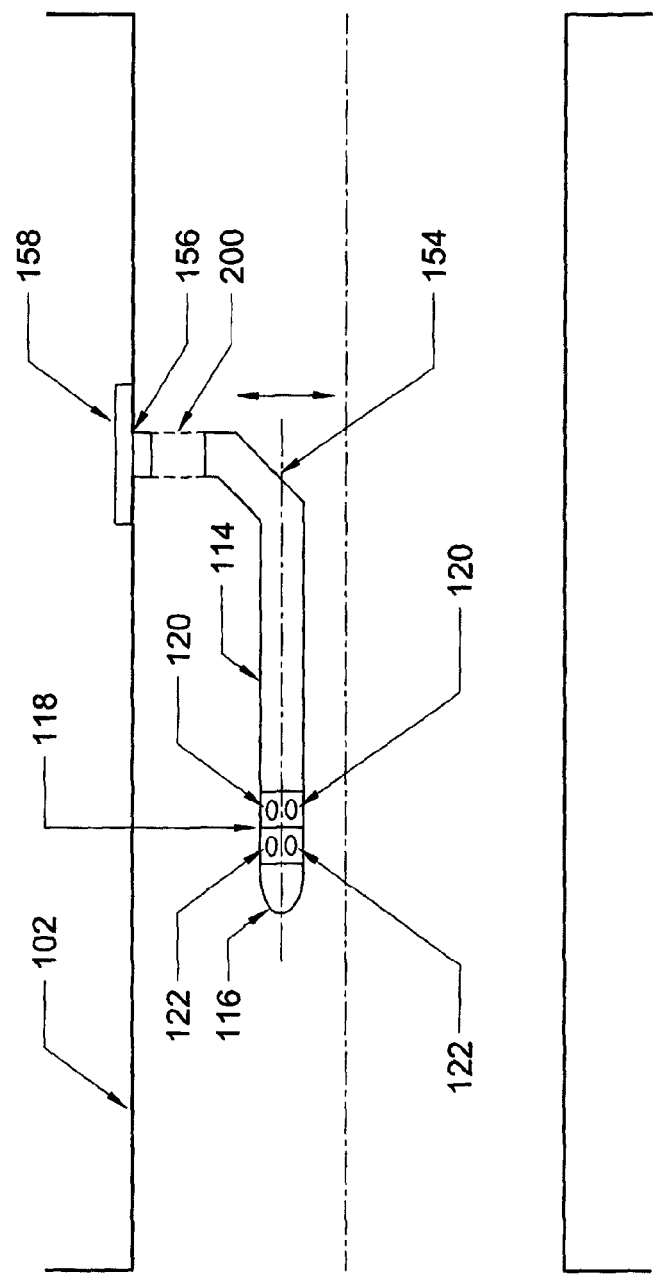
FIG. 23 is a similar view to that of FIG. 8 showing the installation of the flow meter within a pipe and a means of adjusting the diametric length of the mounting bracket to achieve concentricity with the pipe.

If the longitudinal member 114 of FIG. 8 is installed through the access port 156 of pipe 102, then adjustability 200 can be built into the mounting bracket 154 to allow the position of the longitudinal member 114 to be adjusted relative to the centre of pipe 102, as shown in FIG. 23.

Figure 24:
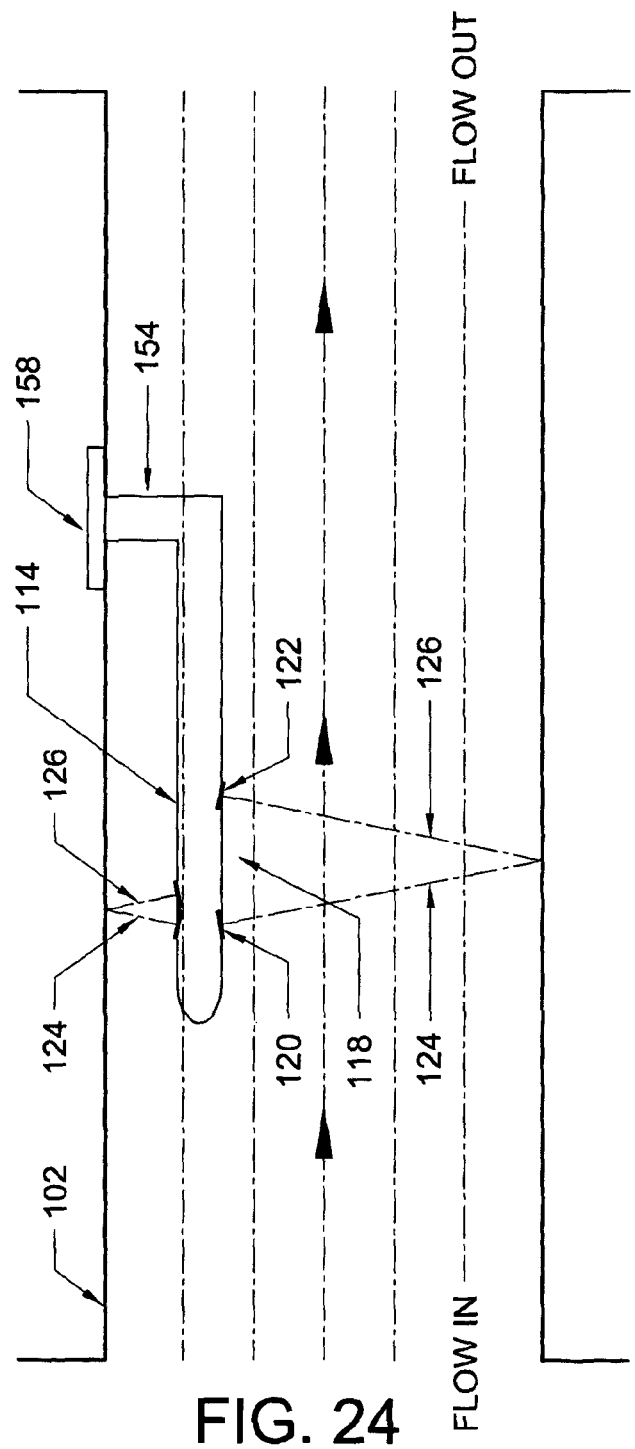
FIG. 24 is a similar view to that of FIG. 8 showing the use of the flow meter mounted eccentrically rather than concentrically.
Figure 25A:
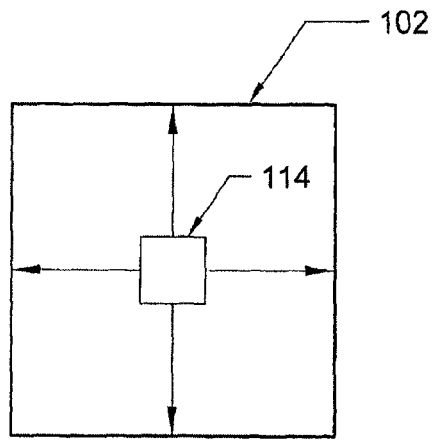
FIG. 25 shows a selection of non-circular or polygonal pipes which can be included as part of the invention.
Figure 25B:
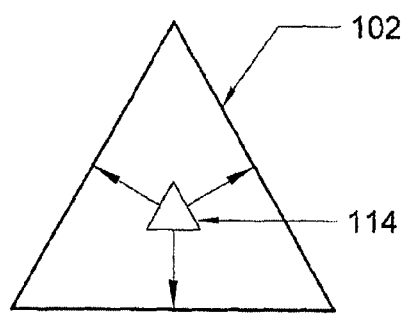
Figure 25C:
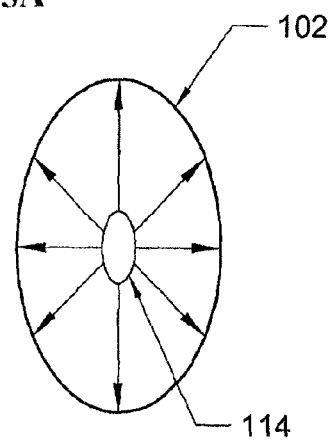
Figure 25D:
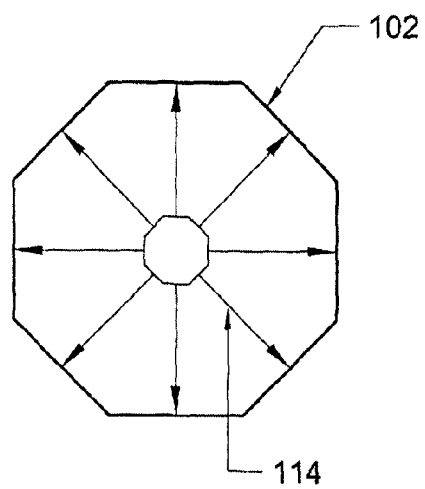

The longitudinal member 114 may also be installed eccentrically within the pipe 102 as illustrated in FIG. 24. As can be seen in this configuration the acoustic planes 124, 126 have differing lengths along the outside perimeter of the acoustic arrays depending on their closeness to the respective inner wall of pipe 102. Alternatively, the transducers in each acoustic plane could be oriented at the angle required for the respective path length to the internal wall of the pipe as illustrated in the variations of pipes 102 shown in FIG. 25. FIG. 25 shows examples of non-circular or polygonal pipes 102 which are not circular in cross-section. The invention, in principle, can use any shape with a matching shape of longitudinal member 104.

FIGS. 26 to 31 show the location of the flow meter 100 in relation to a pump 202.

Figure 26:
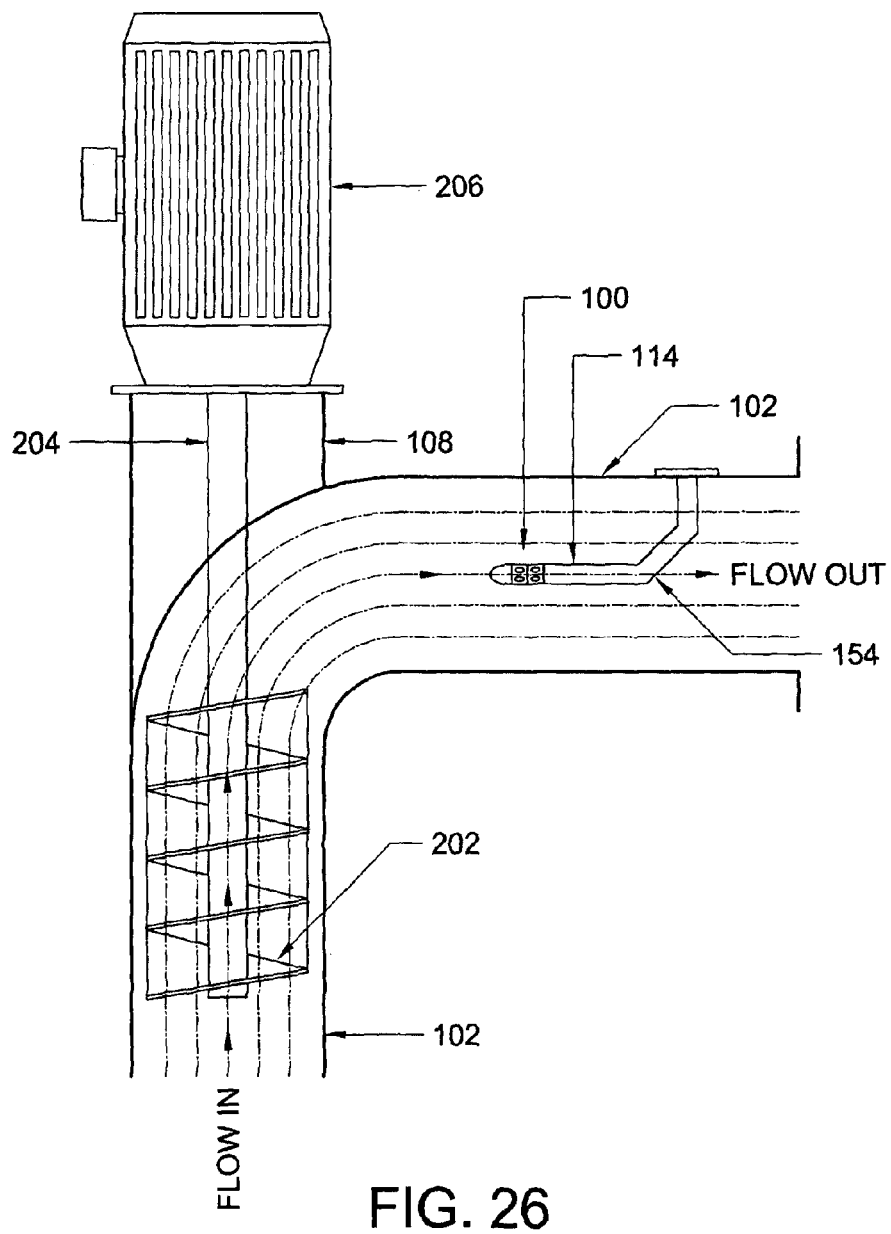
FIG. 26 illustrates the use of the flow meter at the discharge end of a pump located in the pipe.

FIG. 26 shows a screw pump 202 powered by motor 206 through output shaft 204. Flow meter 100 is positioned on the discharge side of screw pump 202.

Figure 27:
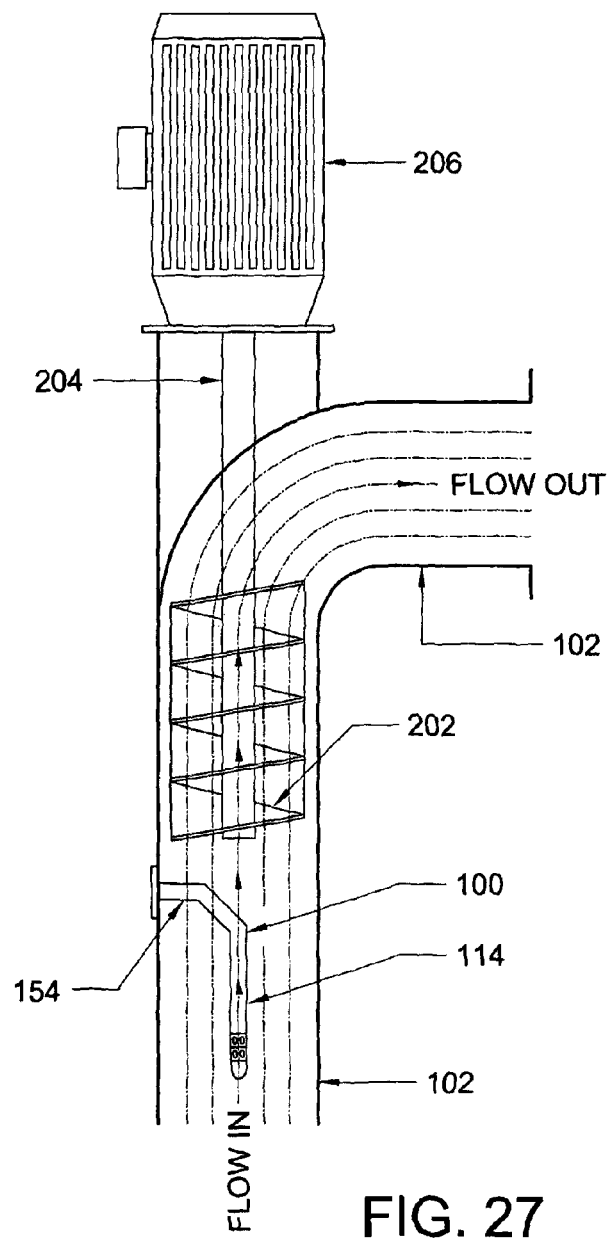
FIG. 27 is a similar view to that of FIG. 26 with the flow meter at the intake end of a pump located in the pipe.
Figure 29:
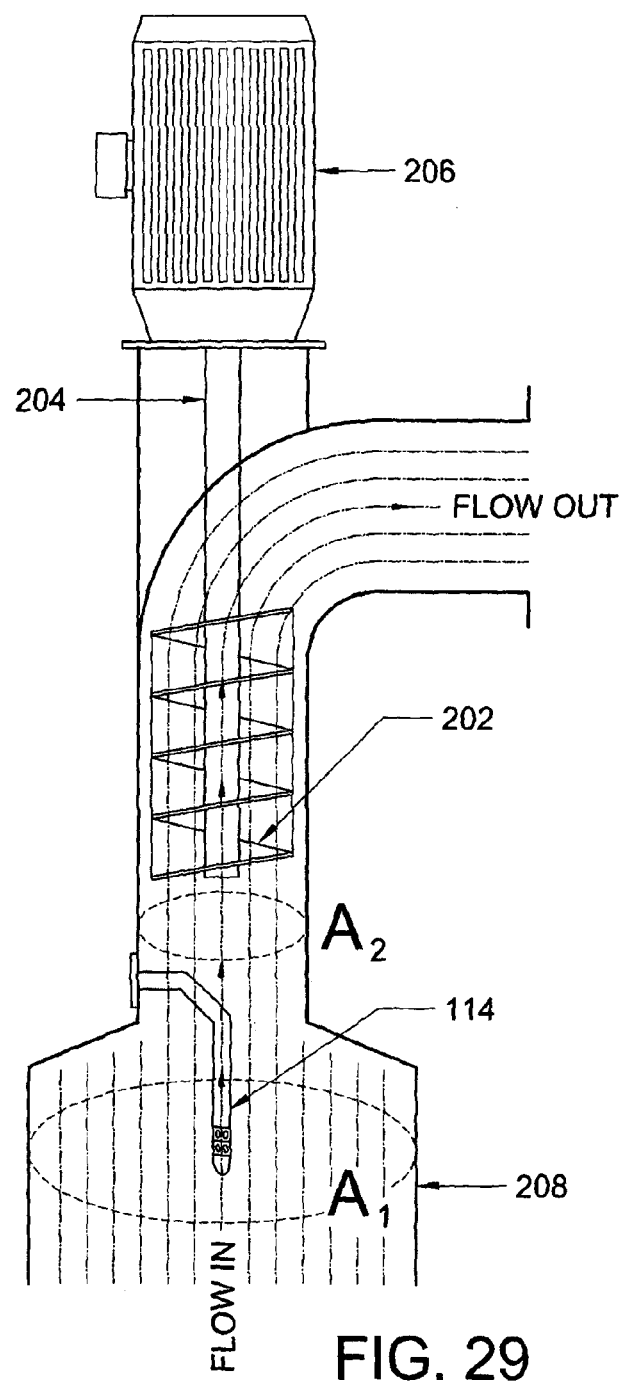
FIG. 29 is a similar view to that of FIG. 27 with an enlarged diameter intake.

FIG. 27 shows flow meter 100 positioned on the suction side of screw pump 202. FIG. 29 shows a variation of FIG. 27 specifically designed to prevent problems associated with cavitation on the suction side of pump 202. The use of a flow meter 100 on the suction side of a pump 202 is generally prohibited by existing metering technologies because the low pressure on the suction side can lead to cavitation which prevents accurate flow measurement. This problem is avoided by locating the acoustic arrays 118 in a larger diameter inlet 208 on the suction side. Because the cross-sectional area of the inlet 208 is larger than the cross sectional area of the pump impeller pipe 102, the fluid velocity is lower within the inlet than it is within the impeller pipe. This lower velocity prevents pressure drop and cavitation within the metering pipe 102.

Figure 28:
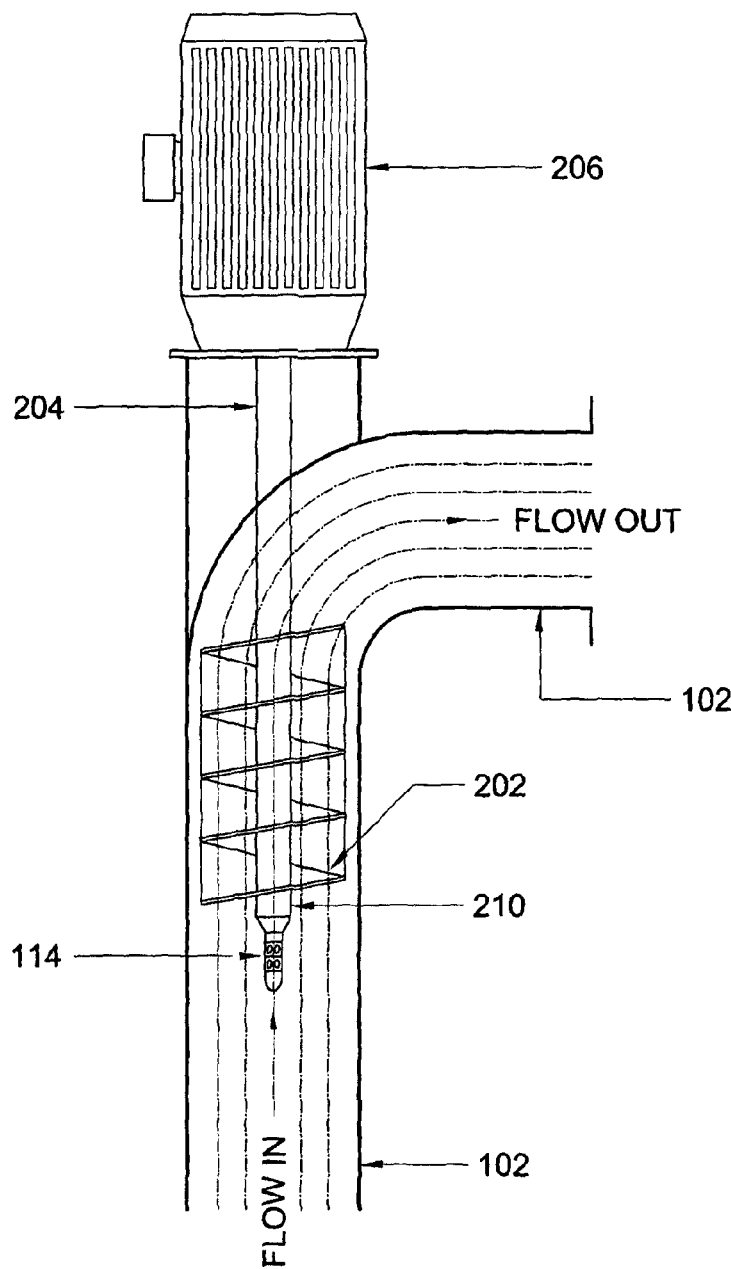
FIG. 28 is a similar view to that of FIG. 26 with the flow meter at the intake end of a pump located on the shaft of the pump.
Figure 30:
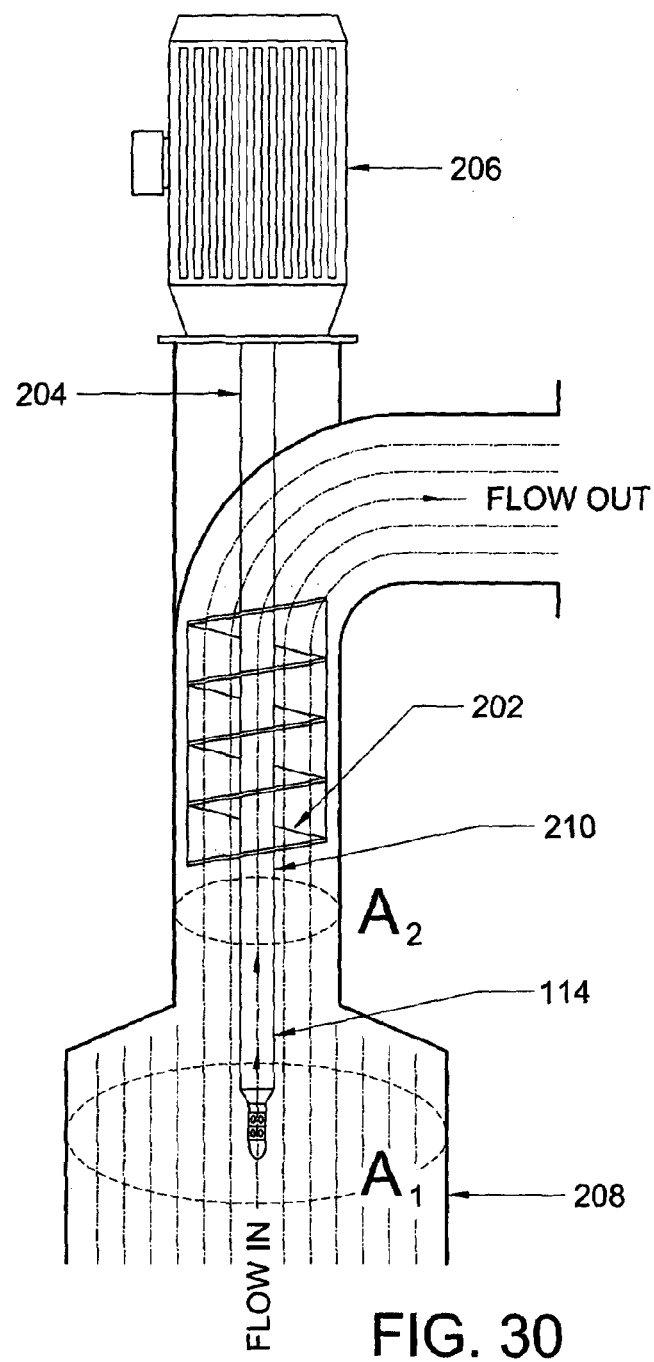
FIG. 30 is a similar view to that of FIG. 28 with an enlarged diameter intake.

FIGS. 28 and 30 show a configuration in which the longitudinal member 114 is supported from the pump impeller 210. The acoustic arrays may rotate with the impeller 210, or may be designed to not rotate. These embodiments will create a pump with an integrated precision flow measurement capability.

Figure 31:
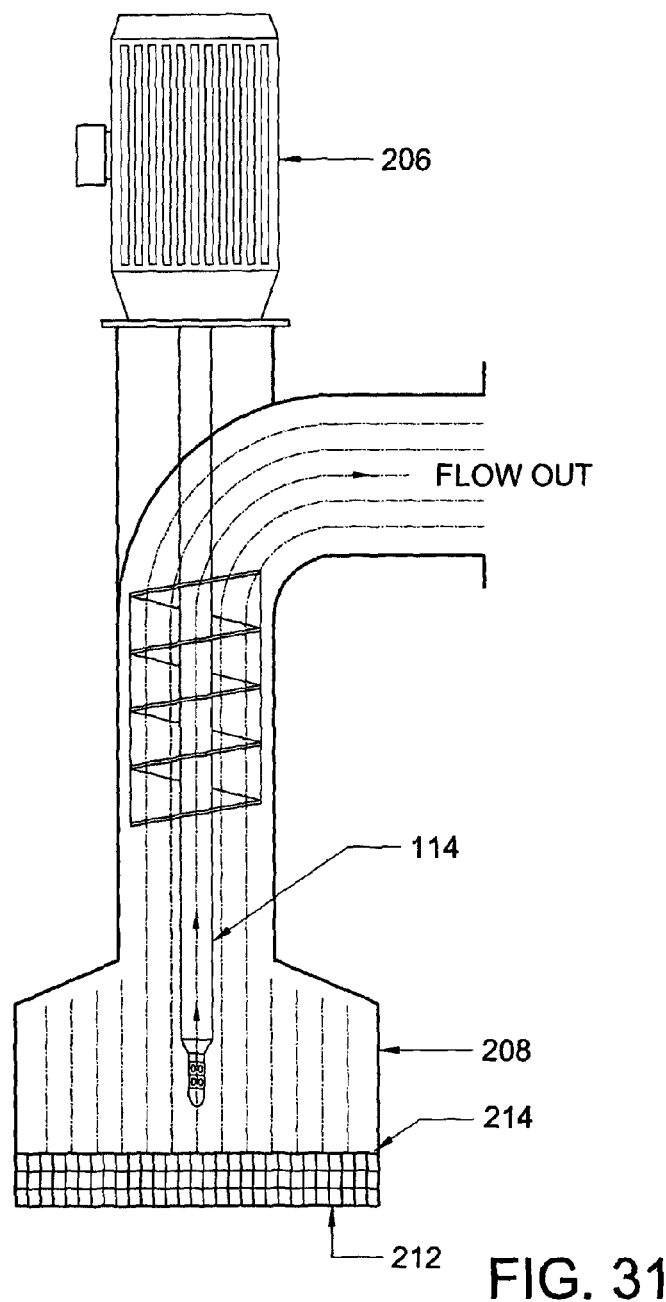
FIG. 31 is a similar view to that of FIG. 30 with a filter cage fitted to the intake.

FIG. 31 shows a filter cage 212 fitted to the base 214 of the pump inlet to prevent objects from entering the assembly and causing damage.

As seen in FIGS. 26 to 31 the acoustic arrays may be installed on the suction or discharge side of the pump 202 to provide an integrated flow measurement capability. The flow meter may be used with any type of pump either on the suction or on the discharge side.

This invention may be used to measure velocity of fluids or gases passing through a pipe or conduit of any shape. The cylindrical array described may be of any shape such that the acoustic transducer orientation is parallel to the internal wall of said pipe or conduit at each radial plane measured. This invention may have application in measurement of flow velocity and hence volumetric transfer in any fluid—including liquids, slurry, gas, air, powders or plasmas.

If a temperature sensor is installed in the flow meter, then the amount of heat being transferred through the pipe can also be calculated. Knowledge of the internal diameter of the pipe allows an accurate speed of sound measurement within the fluid which allows the temperature of the fluid to be determined from a look-up table or algorithm encoded into the sensor software. Additional sensors such as pressure sensors or chemical dosage sensors can also be inserted into the flow meter for further characterization of the fluid flowing through the pipe.

This invention describes an acoustic flow meter specifically designed for use in a pipe configuration in which a propeller meter has previously been used. The acoustic flow meter has no moving parts and does not get clogged by debris, and so presents significant maintenance cost advantages over propeller meters. The invention also provides redundancy and accuracy.

The preferred embodiments describe the use of the invention in pipes but it can also function in open channels as would be evident to a man skilled in the art.

The invention will be understood to embrace many further modifications as will be readily apparent to persons skilled in the art and which will be deemed to reside within the broad scope and ambit of the invention, there having been set forth herein only the broad nature of the invention and certain specific embodiments by way of example.

The invention claimed is:

1. A flow meter for a pipe or open channel, said flow meter including a longitudinal member adapted to, in use, be inserted into said pipe or open channel but free of any internal wall of said pipe or open channel, said longitudinal member having a plurality of pairs of acoustic transducers located therearound with each pair of acoustic transducers having a transmitting transducer and a receiving transducer, whereby said transmitting transducer sends an acoustic signal to an internal wall of said pipe or open channel and said receiving transducer receives the reflected acoustic signal.

2. The flow meter of claim 1, wherein said longitudinal member has a cylindrical or polygonal shape.

3. The flow meter of claim 1, wherein said longitudinal member is secured to an end cap member of a pipe riser.

4. The flow meter of claim, wherein said longitudinal member is mounted to a bracket installed through an access port on a side of said pipe.

5. The flow meter of claim 1, wherein small angles separate respective pairs of acoustic transducers to significantly reduce a likelihood of a flow direction change within a measuring area for each pair of acoustic transducers.

6. The flow meter of claim 1, wherein said longitudinal member is mounted on a shaft of an axial screw pump within said pipe.

7. The flow meter of claim 1 arranged in a large diameter pipe on a suction side of a pump, wherein said large diameter pipe, in use, prevents cavitation which prevents accurate flow measurement.

8. The flow meter of claim 1, further including a plurality of flow straightening vanes attached to said longitudinal member upstream of said acoustic transducers.

9. The flow meter of claim 1 where one or both ends of the longitudinal member are capped with an aerodynamic profile to minimise turbulence and drag and to minimise a likelihood of debris fouling the flow meter.

10. The flow meter of claim 1 where an aerodynamic nose is located several diameters upstream of an acoustic transducer array to allow flow streamlines to align parallel to the pipe walls before crossing the acoustic transducer array.

11. The flow meter of claim 1, wherein said acoustic transducers are switchable between receiving and transmitting acoustic signals.

12. The flow meter of claim 1, wherein each of said receiving transducers is axially offset from each of said transmitting transducers.

13. The flow meter of claim 12, wherein the axial offset between the receiving and transmitting transducers is adjustable so as to suit a multitude of different pipe internal diameters.

14. The flow meter of claim 1, wherein at least one pair of acoustic transducers are arranged about said longitudinal member.

15. The flow meter of claim 1, wherein said longitudinal member is centrally aligned with said pipe or open channel.

16. The flow meter of claim 1, wherein said longitudinal member is eccentrically aligned with said pipe or open channel.

17. The flow meter of claim 1, wherein each of said acoustic transducers can be adjusted for correct alignment.

18. The flow meter of claim 1, wherein said longitudinal member is rotatable, in use.

19. The flow meter of claim 1, wherein said acoustic transducers are set at a desired angle through appropriate recesses in a body member.

20. The flow meter of claim 1, further including an acoustic array on said longitudinal member to allow for a concentricity of the longitudinal member to be verified.

21. The flow meter of claim 1, further including use of multiple acoustic transducer arrays to increase an angular resolution of velocity samples.

22. The flow meter of claim 1, wherein a relatively small angle of 11.25 degrees or less of the acoustic transducers is used to provide more tolerance for acoustic arrays to off centre alignment or an out-of-round pipe.

* * * * *